United States Patent
Mucha et al.

(10) Patent No.: US 11,167,213 B2
(45) Date of Patent: Nov. 9, 2021

(54) ELECTRONIC CONTROLLER WITH HAND RETAINER AND FINGER MOTION SENSING

(71) Applicant: Valve Corporation, Bellevue, WA (US)

(72) Inventors: Jeffrey Walter Mucha, Sammamish, WA (US); Jeffrey George Leinbaugh, Kirkland, WA (US); Eric James Hope, Bellevue, WA (US); Philip Bryan, Bellevue, WA (US); Scott Richard Britt, Kirkland, WA (US); Scott Nietfeld, Bellevue, WA (US); Claire Michelle Gottschalk, Bellevue, WA (US); Jeremy Slocum, Sammamish, WA (US)

(73) Assignee: Valve Corporation, Bellevue, WA (US)

( * ) Notice: Subject to any disclaimer, the term of this patent is extended or adjusted under 35 U.S.C. 154(b) by 159 days.

(21) Appl. No.: 16/520,201

(22) Filed: Jul. 23, 2019

(65) Prior Publication Data

US 2019/0344173 A1 Nov. 14, 2019

Related U.S. Application Data

(63) Continuation of application No. 15/679,521, filed on Aug. 17, 2017, now Pat. No. 10,391,400, which is a
(Continued)

(51) Int. Cl.
*A63F 13/24* (2014.01)
*A63F 13/428* (2014.01)
(Continued)

(52) U.S. Cl.
CPC ............ *A63F 13/428* (2014.09); *A63F 13/24* (2014.09); *G06F 3/014* (2013.01); *A63F 2009/2407* (2013.01)

(58) Field of Classification Search
CPC ........ A63F 13/428; A63F 13/24; A63F 13/98; A63F 13/214; A63F 2009/2407; G06F 3/014; G06F 3/0346; G06F 3/0325
See application file for complete search history.

(56) References Cited

U.S. PATENT DOCUMENTS

| | | |
|---|---|---|
| 4,489,302 A | 12/1984 | Eventoff |
| 4,845,457 A | 7/1989 | Nakanishi |

(Continued)

FOREIGN PATENT DOCUMENTS

| | | |
|---|---|---|
| CN | 106708253 A | 5/2017 |
| JP | WO2018179180 A1 | 10/2018 |
| WO | 2016140924 A1 | 9/2016 |

OTHER PUBLICATIONS

Freescale Semiconductor, Inc. "Touch Sensors", 2009, <<https://www.freescale.com/touch>>, 2 pages.
(Continued)

*Primary Examiner* — Jasson H Yoo
(74) *Attorney, Agent, or Firm* — Lee & Hayes, P.C.

(57) ABSTRACT

A controller for an electronic system includes a controller body having a handle portion, a tracking arc that is fixed to the controller body, and a hand retainer configured to physically bias a user's palm against an outside surface of the handle portion. A plurality of tracking sensors is disposed in the tracking arc, and are responsive to electromagnetic radiation emitted by the electronic system. An array of proximity sensors are spatially distributed around the outer surface of the handle portion, and are responsive to a proximity of the user's fingers to the outside surface of the handle portion.

20 Claims, 5 Drawing Sheets

Related U.S. Application Data continuation-in-part of application No. 29/580,635, filed on Oct. 11, 2016, now Pat. No. Des. 806,173.

(60) Provisional application No. 62/520,958, filed on Jun. 16, 2017.

(51) Int. Cl.
*G06F 3/01* (2006.01)
*A63F 9/24* (2006.01)

(56) References Cited

U.S. PATENT DOCUMENTS

| | | | |
|---|---|---|---|
| 5,184,120 A | 2/1993 | Schultz | |
| 5,302,936 A | 4/1994 | Yaniger | |
| 5,912,612 A | 6/1999 | DeVolpi | |
| 6,097,374 A | 8/2000 | Howard | |
| 6,285,276 B1 | 9/2001 | Nedele et al. | |
| 6,388,556 B1 | 5/2002 | Imai et al. | |
| 6,570,078 B2 | 5/2003 | Ludwig | |
| 6,829,942 B2 | 12/2004 | Yanai et al. | |
| 7,112,755 B2 | 9/2006 | Kitano et al. | |
| 7,932,892 B2 | 4/2011 | Chen et al. | |
| 8,062,126 B2 | 11/2011 | Marks et al. | |
| 8,274,358 B2 | 9/2012 | Ando et al. | |
| 8,586,882 B2 | 11/2013 | Tanaka et al. | |
| 8,636,199 B1 | 1/2014 | Slayden et al. | |
| 8,754,746 B2 | 6/2014 | Lukas et al. | |
| 8,816,964 B2 | 8/2014 | Edwards | |
| 9,508,504 B2 | 11/2016 | Suzuki et al. | |
| 9,690,408 B1 | 6/2017 | Krah | |
| 9,696,223 B2 | 7/2017 | Lisseman et al. | |
| 9,950,256 B2 | 4/2018 | Lim | |
| 10,307,669 B2* | 6/2019 | Hope | A63F 13/213 |
| 10,353,506 B2 | 7/2019 | Vosgueritchian et al. | |
| 10,386,224 B2 | 8/2019 | Shim et al. | |
| 10,391,400 B1* | 8/2019 | Mucha | A63F 13/98 |
| 10,427,035 B2 | 10/2019 | Schmitz et al. | |
| 10,441,881 B2 | 10/2019 | Burgess et al. | |
| 10,444,094 B1 | 10/2019 | Ocampo | |
| 10,549,183 B2* | 2/2020 | Hope | A63F 13/218 |
| 2001/0035856 A1 | 11/2001 | Myers | |
| 2002/0010020 A1 | 1/2002 | Johnson | |
| 2002/0175894 A1 | 11/2002 | Grillo | |
| 2003/0006962 A1* | 1/2003 | Bajramovic | G06F 3/014 345/158 |
| 2003/0043014 A1 | 3/2003 | Nakazawa et al. | |
| 2003/0090465 A1 | 5/2003 | Dellinger | |
| 2004/0012557 A1 | 1/2004 | Daniel | |
| 2005/0172734 A1 | 8/2005 | Alsio et al. | |
| 2005/0179644 A1 | 8/2005 | Alsio et al. | |
| 2005/0259069 A1 | 11/2005 | Baker et al. | |
| 2006/0111180 A1 | 5/2006 | Cheng | |
| 2006/0146018 A1 | 7/2006 | Arneson et al. | |
| 2006/0293864 A1 | 12/2006 | Soss | |
| 2007/0078316 A1 | 4/2007 | Hoarau et al. | |
| 2007/0119698 A1 | 5/2007 | Day | |
| 2007/0146349 A1 | 6/2007 | Errico et al. | |
| 2007/0249422 A1 | 10/2007 | Podoloff | |
| 2007/0279380 A1 | 12/2007 | Murillo | |
| 2008/0136778 A1* | 6/2008 | Hursh | G06F 3/014 345/164 |
| 2008/0141950 A1* | 6/2008 | Glazer | A01K 27/004 119/770 |
| 2008/0146336 A1 | 6/2008 | Feldman et al. | |
| 2008/0261693 A1 | 10/2008 | Zalewski | |
| 2008/0261695 A1 | 10/2008 | Coe | |
| 2008/0311990 A1 | 12/2008 | Chiu et al. | |
| 2009/0005166 A1 | 1/2009 | Sato | |
| 2009/0143141 A1 | 6/2009 | Wells et al. | |
| 2009/0205878 A1 | 8/2009 | Taylor | |
| 2009/0256817 A1 | 10/2009 | Perlin et al. | |
| 2009/0305786 A1 | 12/2009 | Chang | |
| 2010/0090949 A1* | 4/2010 | Tianqiao | G06F 3/014 345/158 |
| 2010/0194682 A1 | 8/2010 | Orr et al. | |
| 2010/0245239 A1 | 9/2010 | Sternberg | |
| 2011/0059796 A1 | 3/2011 | Kondo et al. | |
| 2011/0080339 A1 | 4/2011 | Sun et al. | |
| 2011/0084932 A1 | 4/2011 | Simmons et al. | |
| 2011/0159959 A1 | 6/2011 | Mallinson et al. | |
| 2011/0221564 A1 | 9/2011 | Deppiesse et al. | |
| 2012/0088580 A1 | 4/2012 | Takeda et al. | |
| 2012/0143091 A1 | 6/2012 | Annett et al. | |
| 2012/0214594 A1 | 8/2012 | Kirovski et al. | |
| 2012/0326911 A1 | 12/2012 | Niwa et al. | |
| 2013/0027341 A1 | 1/2013 | Mastandrea | |
| 2013/0063342 A1 | 3/2013 | Chen et al. | |
| 2013/0096849 A1 | 4/2013 | Campbell et al. | |
| 2014/0015633 A1 | 1/2014 | Nakae et al. | |
| 2014/0098018 A1 | 4/2014 | Kim et al. | |
| 2014/0240267 A1 | 8/2014 | Luo | |
| 2014/0274397 A1 | 9/2014 | Sebastian | |
| 2014/0313168 A1 | 10/2014 | Luo | |
| 2014/0366650 A1 | 12/2014 | Thillainadarajah et al. | |
| 2015/0084884 A1 | 3/2015 | Fadili | |
| 2015/0091858 A1 | 4/2015 | Rosenberg et al. | |
| 2015/0120777 A1 | 4/2015 | Ramos | |
| 2015/0352437 A1 | 12/2015 | Koseki et al. | |
| 2015/0359457 A1 | 12/2015 | Blumenthal et al. | |
| 2016/0026253 A1 | 1/2016 | Bradski et al. | |
| 2016/0030835 A1 | 2/2016 | Argiro | |
| 2016/0085355 A1 | 3/2016 | Pirogov et al. | |
| 2016/0124500 A1 | 5/2016 | Lee et al. | |
| 2016/0246369 A1 | 8/2016 | Osman | |
| 2016/0259404 A1 | 9/2016 | Woods | |
| 2016/0283008 A1 | 9/2016 | Perlin et al. | |
| 2016/0306932 A1 | 10/2016 | Fateh et al. | |
| 2016/0317267 A1 | 11/2016 | Meerbeek et al. | |
| 2016/0342218 A1 | 11/2016 | Burba et al. | |
| 2016/0356658 A1 | 12/2016 | Hou et al. | |
| 2016/0357261 A1 | 12/2016 | Bristol et al. | |
| 2016/0364002 A1 | 12/2016 | Gates et al. | |
| 2016/0364910 A1 | 12/2016 | Higgins et al. | |
| 2017/0031503 A1 | 2/2017 | Rosenberg et al. | |
| 2017/0135586 A1 | 5/2017 | Jeon et al. | |
| 2017/0139481 A1 | 5/2017 | Long | |
| 2017/0177102 A1 | 6/2017 | Long | |
| 2017/0189798 A1 | 7/2017 | Rogoza et al. | |
| 2017/0189800 A1 | 7/2017 | Crain | |
| 2017/0192506 A1 | 7/2017 | Andersen et al. | |
| 2017/0205903 A1 | 7/2017 | Miller et al. | |
| 2017/0351345 A1 | 12/2017 | Nirjon et al. | |
| 2018/0025531 A1 | 1/2018 | Terahata | |
| 2018/0067545 A1 | 3/2018 | Provancher et al. | |
| 2018/0075658 A1 | 3/2018 | Lanier et al. | |
| 2018/0099219 A1 | 4/2018 | Hope et al. | |
| 2018/0104576 A1 | 4/2018 | Hope et al. | |
| 2018/0161670 A1 | 6/2018 | Boev | |
| 2018/0188816 A1* | 7/2018 | Liu | A63F 13/214 |
| 2018/0272232 A1 | 9/2018 | Campbell et al. | |
| 2019/0009172 A1* | 1/2019 | Sawai | A63F 13/245 |
| 2019/0076716 A1 | 3/2019 | Chiou et al. | |
| 2019/0102927 A1 | 4/2019 | Yokokawa | |
| 2019/0138107 A1 | 5/2019 | Nietfeld et al. | |
| 2019/0155384 A1 | 5/2019 | Fajt et al. | |
| 2019/0232160 A1 | 8/2019 | Hope et al. | |
| 2019/0308110 A1 | 10/2019 | Muramatsu et al. | |
| 2019/0325651 A1 | 10/2019 | Bradner et al. | |
| 2020/0218377 A1 | 7/2020 | Dalton et al. | |
| 2020/0246691 A1 | 8/2020 | Petersen et al. | |
| 2021/0069582 A1 | 3/2021 | Campbell et al. | |
| 2021/0129016 A1 | 5/2021 | Hope et al. | |

OTHER PUBLICATIONS

Invitation to Pay Fees dated Aug. 6, 2019 for Application PCT/US2019/32982 "Sensor Fusion Algorithms for a Handheld Controller That Includes a Force Sensing Resistor (FSR)", 2 pages.

Non Final Office Action dated Jul. 23, 2019 for U.S. Appl. No. 15/984,245 "Sensor Fusion Algorithms for a Handheld Controller That Includes a Force Sensing Resistor (FSR)" Dalton, 18 pages.

(56) References Cited

OTHER PUBLICATIONS

Final Office Action dated Jul. 29, 2019 for U.S. Appl. No. 15/834,425 "Electronic Conlrollerwitha Hand Retainer, outer shell, and finger sensing" Hope, 23 pages.
PCT Search Report and Written Opinion dated Jul. 24, 2019 for PCT Application No. PCT/US19/32928, 4 pages.
PCT Search Report and Written Opinion dated Aug. 15, 2019 for PCT Application No. PCT/US2019/032968, 12 pages.
PCT Search Report and Written Opinion dated Oct. 8, 2019 for PCT Application No. PCT/US19/32982, 11 pages.
Office Action for U.S. Appl. No. 16/389,499, dated Oct. 7, 2020, Bradner, "Holding and Releasing Virtual Objects",24 Pages.
Office Action for U.S. Appl. No. 16/389,629, dated Nov. 30, 2020, Bradner, "Holding and Releasing Virtual Objects", 11 Pages.
Non Final Office Action dated Sep. 18, 2019 for U.S. Appl. No. 16/289,420 "Sensor Fusion Algorithms for a Handheld Controller That Includes a Force Sensing Resistor (FSR)" Leinbaugh, 13 pages.
Non Final Office Action dated Sep. 19, 2019 for U.S. Appl. No. 15/984,231 "Force Sensing Resistor (FSR) With Polyimide Substrate, Systems, and Methods Thereof" Campbell, 35 pages.
PCT Search Report and Written Opinion dated Sep. 10, 2019 for PCT Application No. PCT/US2019/037794, 10 pages.
PCT Search Report and Written Opinion dated Sep. 17, 2019 for PCT Application No. PCT/US2019/037802, 7 pages.
Final Office Action dated Feb. 4, 2020 for U.S. Appl. No. 16/010,385 "Electronic Controller with Finger Motion Sensing" Nietfeld, 12 pages.
Non Final Office Action dated Jun. 12, 2020 for U.S. Appl. No. 16/392,497, "Electronic Controller With Finger Sensing and an Adjustable Hand Retainer", Petersen, 13 pages.
Non Final Office Action dated Jun. 18, 2020 for U.S. Appl. No. 16/377,058, "Electronic Controller With Finger Sensing and an Adjustable Hand Retainer", Hope, 18 pages.
Non Final Office Action dated Jun. 22, 2020 for U.S. Appl. No. 16/195,718, "Virtual Reality Hand Gesture Generation", Nietfeld, 26 pages.
Non Final Office Action dated Jul. 20, 2020 for U.S. Appl. No. 16/389,499, "Holding and Releasing Virtual Objects", Bradner, 22 pages.
PCT Search Report and Written Opinion dated Jul. 1, 2020 for PCT Application No. PCT/US2020/028517, 13 pages.
Valve, "Knuckles EV2: Adjust Strap", YouTube, Jun. 2018, retrieved from internet:<URL: https:llwww.youtube.com/watch?time_ continue= 6&v=H ExyOQX5POs&feature=emb title>, 18 pages.
Valve Corporation, "Knuckles EV2: What's New", Sep. 2018, retrieved from Internet <URL:https://steamcommunity com/sharedfiles/ filedetails/?id=1411984190>, 7 Pages.
Extended European Search Report dated Jan. 27, 2021 for European Patent Application No. 18817972.5, 7 pages.
Brown et al., "5 improvements we're excited to see from Valve's 'Knuckles' controllers", retrieved on Jan. 20, 2019 at <<https:// www.vrheads.com/5-Improvements-were-exclted-see-valves-knuckles-controllers>>, VR Heads, Jul. 11, 2017.
Non Final Office Action dated Jan. 8, 2019 for U.S. Appl. No. 15/679,521 "Electronic Controller With Hand Retainer and Finger Motion Sensing" Mucha, 11 pages.
Non Final Office Action dated Jan. 8, 2019 for U.S. Appl. No. 15/834,425 "Electronic Controller with a Hand Retainer, outer shell, and finger sensing" Hope, 11 pages.
Non Final Office Action dated Jul. 15, 2019 for U.S. Appl. No. 16/010,385 "Electronic Controller with Finger Motion Sensing" Nietfeld, 11 pages.
Non Final Office Action dated Jan. 18, 2019 for U.S. Appl. No. 15/834,425 "Electronic Controller with a Hand Retainer, outer shell, and finger sensing" Hope, 20 pages.
Notification of Transmittal of the International Search Report and the Written Opinion of the International Search Authority, or the Declaration (in English) of Int. App. No. PCT/US18/37952, filed on Jun. 15, 2018, dated Sep. 10, 2018 from ISA/US, 19 pages.
PCT Search Report and Written Opinion dated Feb. 6, 2019 for PCT Application No. PCT/US2018/064116, 8 pages.
PCT Search Report and Written Opinion dated Feb. 8, 2019 for PCT Application No. PCT/US2018/064120, 11 pages.
Non Final Office Action dated Mar. 18, 2020 for U.S. Appl. No. 15/984,231 "Force Sensing Resistor (FSR) With Polyimide Substrate, Systems, and Methods Thereof", Campbell, 12 pages.
Brown, Exploring the Magic behind the HTC Vive Controller, retrieved on Feb. 17, 2021 at https://www.vrheads.com/exposing-magic-behind-htc-vive-controller, VRHeads, Jul. 28, 2016.
EP Search Report from corresponding EP Application No. 188864854 dated Mar. 1, 2021, 12 pages.
SlagCoin Instruction Manual for a Joystick Controller "SlagCoin Appendix—Joystick Controller" last updated Feb. 25, 2009 www. slagcoin.com/joystick.html 52 pages.
WICO Corporation Consumer Division Manuel for "WICO Commmand Control" Trackball controller, 1982, 6 pages.

\* cited by examiner

ELECTRONIC CONTROLLER WITH HAND RETAINER AND FINGER MOTION SENSING

CROSS-REFERENCE TO RELATED APPLICATIONS

This application is a continuation of commonly owned U.S. patent application Ser. No. 15/679,521 filed 17 Aug. 2017, entitled "ELECTRONIC CONTROLLER WITH HAND RETAINER AND FINGER MOTION SENSING," which itself claims priority under 35 U.S.C. § 119 to U.S. Provisional Patent Application No. 62/520,958 filed 16 Jun. 2017, and claims priority under 35 U.S.C. § 120 as a continuation-in part to U.S. patent application Ser. No. 29/580,635 filed 11 Oct. 2016, now U.S. Pat. No. D806,173. Application Ser. Nos. 15/679,521, 62/520,958, and 29/580,635 are hereby incorporated by reference in their entirety.

BACKGROUND

The video game industry has become large and important, and has spawned many innovations in both software and related hardware. Various hand-held video game controllers have been designed, manufactured, and sold, for a variety of game applications. Some of those innovations have applicability outside of the video game industry, such as for controllers of industrial machines, defense systems, robotics, etc. Virtual reality (VR) systems are an application of great contemporary interest and rapid technical advancement, both within and outside of the video game industry. The controllers for VR systems have to perform several different functions, and meet strict (and sometimes competing) design constraints, often while optimizing certain desired characteristics like ease of use, etc. Hence, there is a need in the art for an improved controller design that may improve VR systems and/or better facilitate user operation.

DETAILED DESCRIPTION OF EXAMPLE EMBODIMENTS

FIGS. 1-4 depict a controller 100 for an electronic system according to an example embodiment of the present invention. The controller 100 may be utilized by an electronic system such as a VR video gaming system, a robot, weapon, or medical device. The controller 100 may include a controller body 110 having a handle portion 112, and a hand retainer 120 to retain the controller 100 in the hand of a user (e.g. the user's left hand). The handle portion 112 may optionally be substantially cylindrical. In this context, a substantially cylindrical shape need not have constant diameter, or a perfectly circular cross-section.

In the embodiment of FIGS. 1-4, the controller body 110 may include a distal head (between the handle portion 112 and a distal end 111), which may optionally include one or more thumb-operated controls 114, 115, 116. For example, a tilting button, or any other button, knob, wheel, joystick, or trackball may be considered as a thumb-operated control if it may be conveniently manipulated by a user's thumb during normal operation while the controller 100 is held in the hand of the user.

The controller 100 preferably includes a tracking arc 130 that is fixed to the controller body 110, and optionally includes two noses 132, 134, each protruding from a corresponding one of two opposing distal ends of the tracking arc 130. The tracking arc 130 preferably includes a plurality of tracking sensors disposed therein, with at least one tracking sensor disposed in each protruding nose 132, 134. Additional tracking sensors may be disposed also in the controller body 110, with preferably at least one distal tracking sensor disposed adjacent the distal end 111.

The foregoing tracking sensors are preferably responsive to electromagnetic radiation emitted by the electronic system. For example, the electronic system may be a VR gaming system that widely broadcasts, i.e. paints, pulsed infra-red radiation (i.e. IR light) towards the controller 100, with the plurality of tracking sensors of the tracking arc 130 being IR light sensors that may receive or be shadowed from the broadcast pulsed IR light. The tracking sensors in each nose 132, 134 (e.g. 3 sensors in each nose) preferably overhang the user's hand on each distal end of the tracking arc 130, and so are better exposed (around the user's hand) to the electromagnetic radiation emitted by the electronic system, at more angles without an unacceptable amount of shadowing.

In certain embodiments, each of the IR light sensors may be covered by a layer of IR-transmissive polycarbonate plastic, which may form a window to permit IR light to affect that sensor. For example, the tracking arc may be fabricated from a so-called "double shot" injection molding process, so that the majority of the tracking arc is fabricated from IR-opaque plastic, but with IR-transmissive plastic being disposed above the IR light sensors. Alternatively, the sensors may be disposed over the IR-opaque plastic but beneath an IR-transmissive plastic film (e.g. a thin laminated film). In certain embodiments, each of the IR light sensors may be recessed into the tracking arc 130, with the IR transmissive polycarbonate plastic forming a narrow window above it, so that each sensor receives IR light only from a preferred angular range (e.g. to avoid undesired internal IR reflections).

In other embodiments, the tracking arc 130 and the controller body 110 may be fabricated from an IR-transmissive plastic, with an outer IR-opaque coating to reduce undesired internal IR reflections. In such embodiments, the outer IR-opaque coating may include openings over the locations of the infrared (IR) light sensors to create windows above them. The response of the plurality of tracking sensors may be communicated back to the electronic system, and the system may interpret such response to effectively track the location and orientation of the controller 100.

Preferably, the tracking arc 130 and the controller body 110 are made of a substantially rigid material such as hard plastic, and are firmly fixed together so that they do not appreciably translate or rotate relative to each other. In this way, the tracking of the translation and rotation of the constellation of tracking sensors in space, is preferably not complicated by motion of the tracking sensors relative to each other. For example, as shown in FIGS. 1-4, the tracking arc 130 may be fixed to the controller body 110 by being joined to the controller body 110 at two locations. The hand retainer 120 may be attached to the controller 100 (either the controller body 110 or the tracking arc 130) adjacent those two locations, to bias the user's palm against the outside surface of the handle portion 112 between the two locations.

In certain embodiments, the tracking arc 130 and the controller body 110 may comprise an integral monolithic component having material continuity, rather than being assembled together. For example, the tracking arc 130 and the controller body 110 may be molded together by a single injection-molding process step, resulting in one integral hard plastic component that comprises both the tracking arc 130 and the controller body 110. Alternatively, the tracking arc 130 and the controller body 110 may be initially fabricated separately, and then later assembled together. Either way, the tracking arc 130 may be considered as fixed to the controller body 110.

Figure 1:
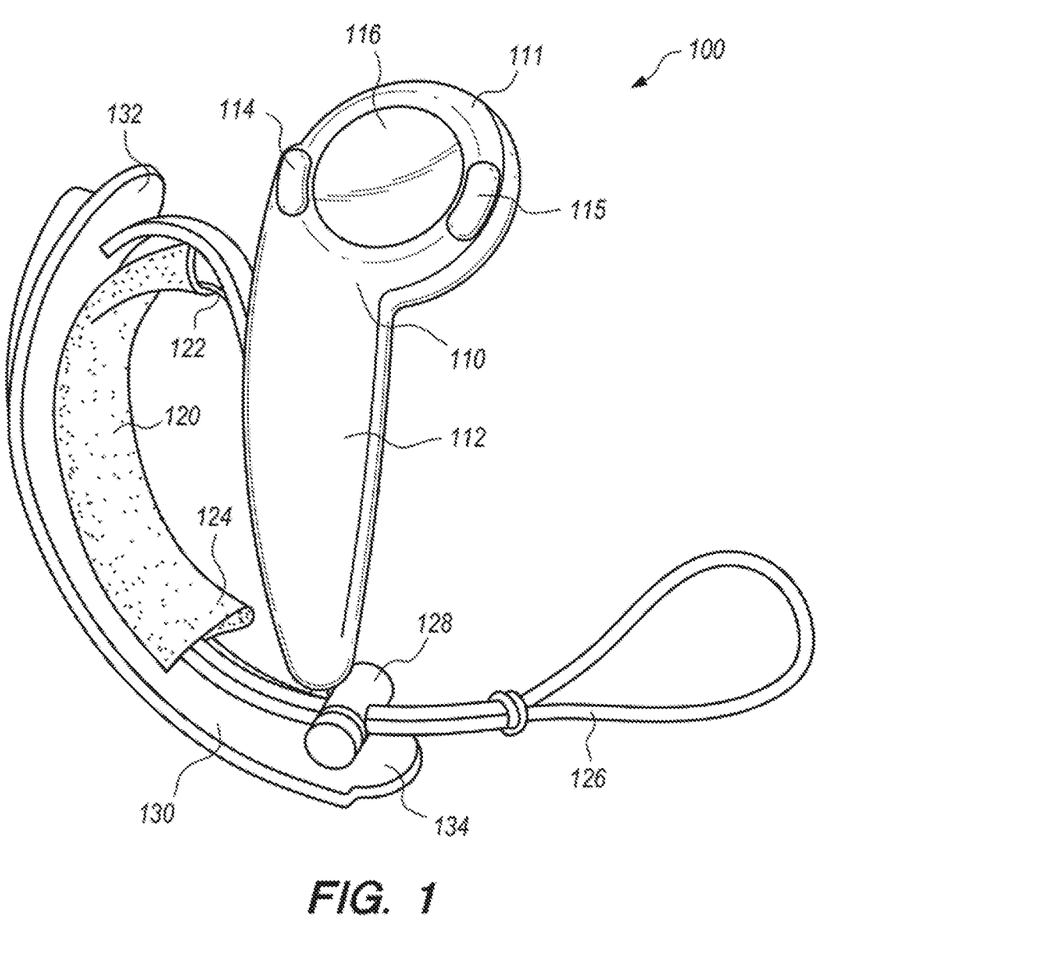
FIG. 1 depicts a controller according to an example embodiment of the present invention, with a hand retainer in an open position.

The hand retainer 120 is shown in the open position in FIG. 1. The hand retainer 120 may optionally be biased in the open position by a curved resilient member 122, to facilitate the insertion of the user's left hand between the hand retainer 120 and the controller body 110 when the user is grasping for the controller with vision blocked by VR goggles. For example, the curved resilient member 122 may optionally be a flexible metal strip that elastically bends, or may comprise an alternative plastic material such as nylon that may bend substantially elastically. The curved resilient member 122 may optionally be partially or completely internal to or covered by a cushion or fabric material 124 (e.g. a neoprene sheath), for the user's comfort. Alternatively, the cushion or fabric material 124 may be disposed on (e.g. adhered to) only the side of the curved resilient member 122 that faces the user's hand.

The hand retainer 120 optionally may be adjustable in length, for example by including a draw cord 126 that is cinched by a spring-biased chock 128. The draw cord 126 may optionally have an excess length that may be used as a lanyard. The sheath 124 optionally may be attached to the draw cord. In certain embodiments, the curved resilient member 122 may be preloaded by the tension of the cinched draw cord 128. In such embodiments, the tension that the curved resilient member 122 imparts to the hand retainer 120 (to bias it in the open position) causes the hand retainer to automatically open when the draw cord 128 is un-cinched. This disclosure also contemplates alternative conventional ways to adjust the length of a hand retainer 120, such as a cleat, an elastic band (that temporarily stretches when the hand is inserted, so that it applies elastic tension to press against the back of the hand), a hook & loop strap attachment that allows length adjustment, etc.

Figure 2:
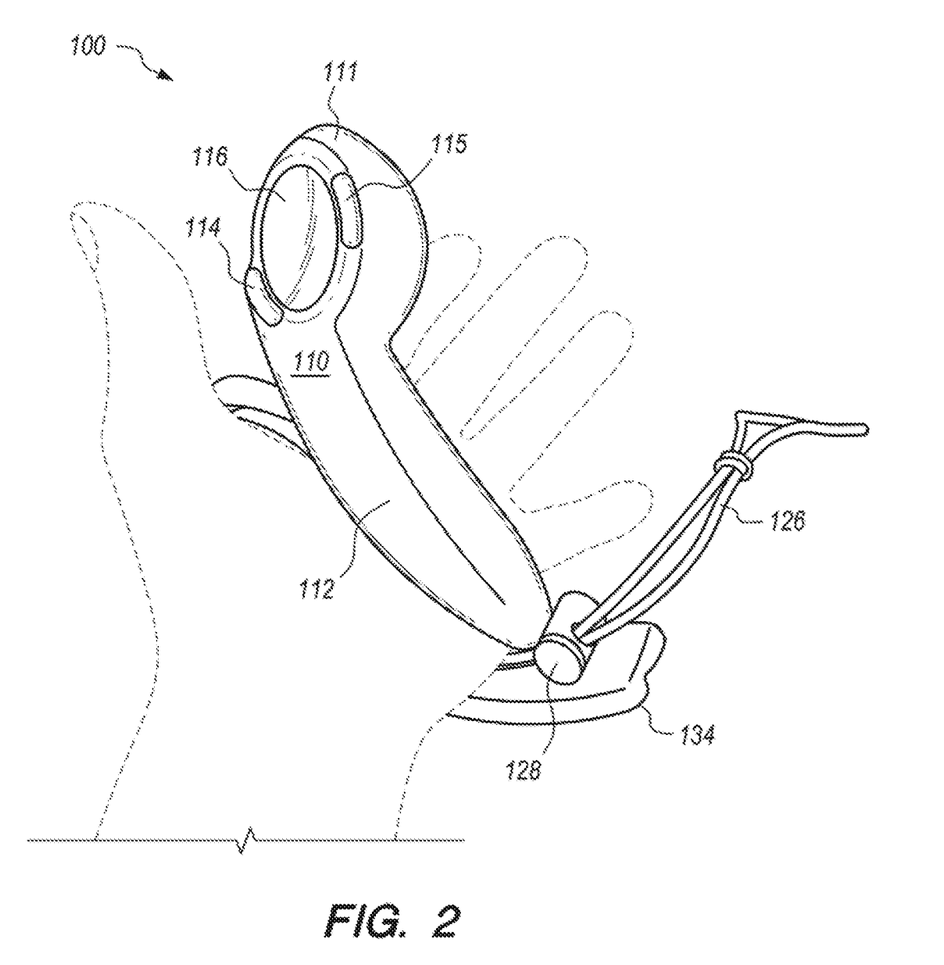
FIG. 2 depicts the controller of FIG. 1 in a user's open hand, palm up.
Figure 3:
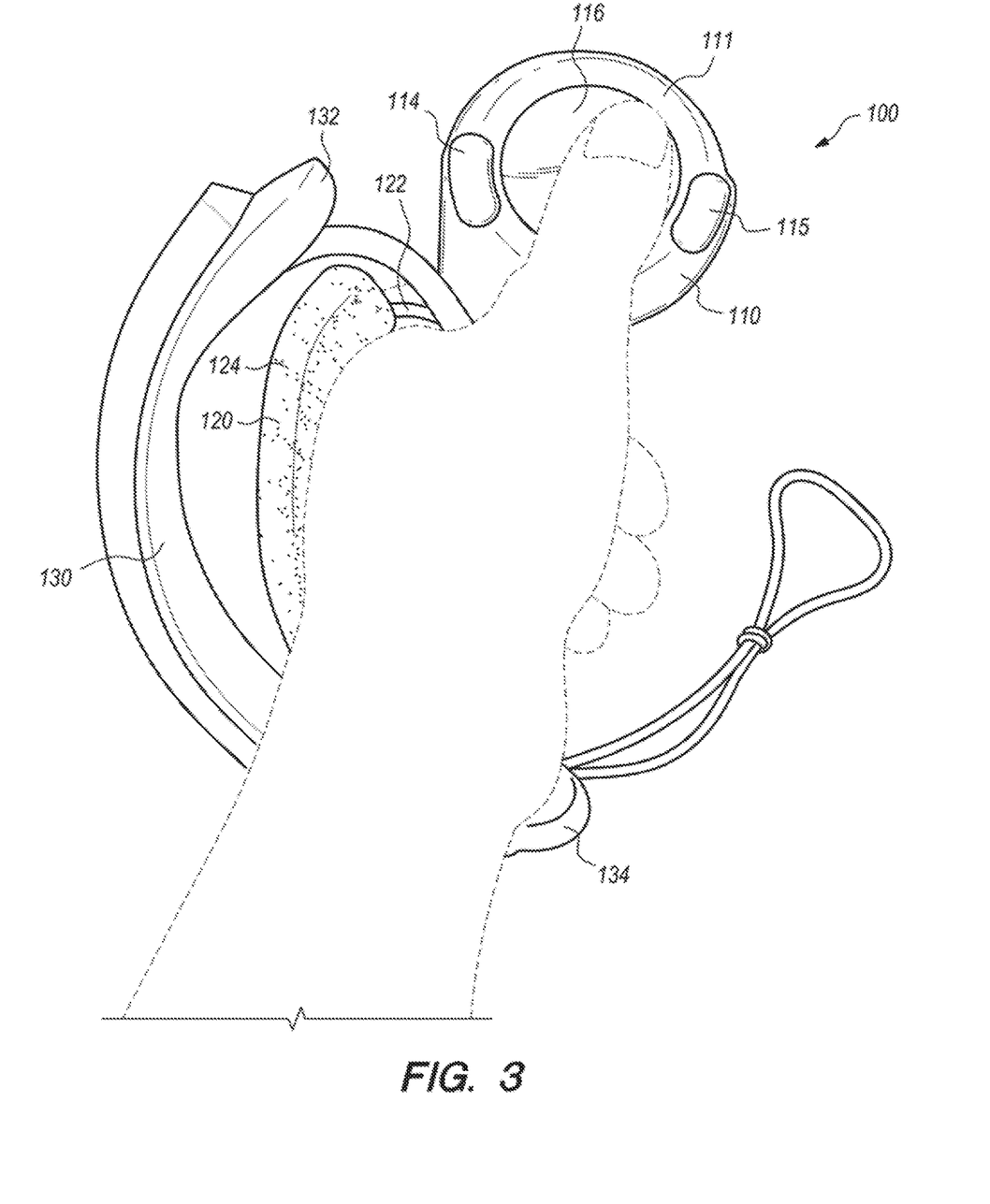
FIG. 3 depicts the controller of FIG. 1 in a user's closed hand.
Figure 4:
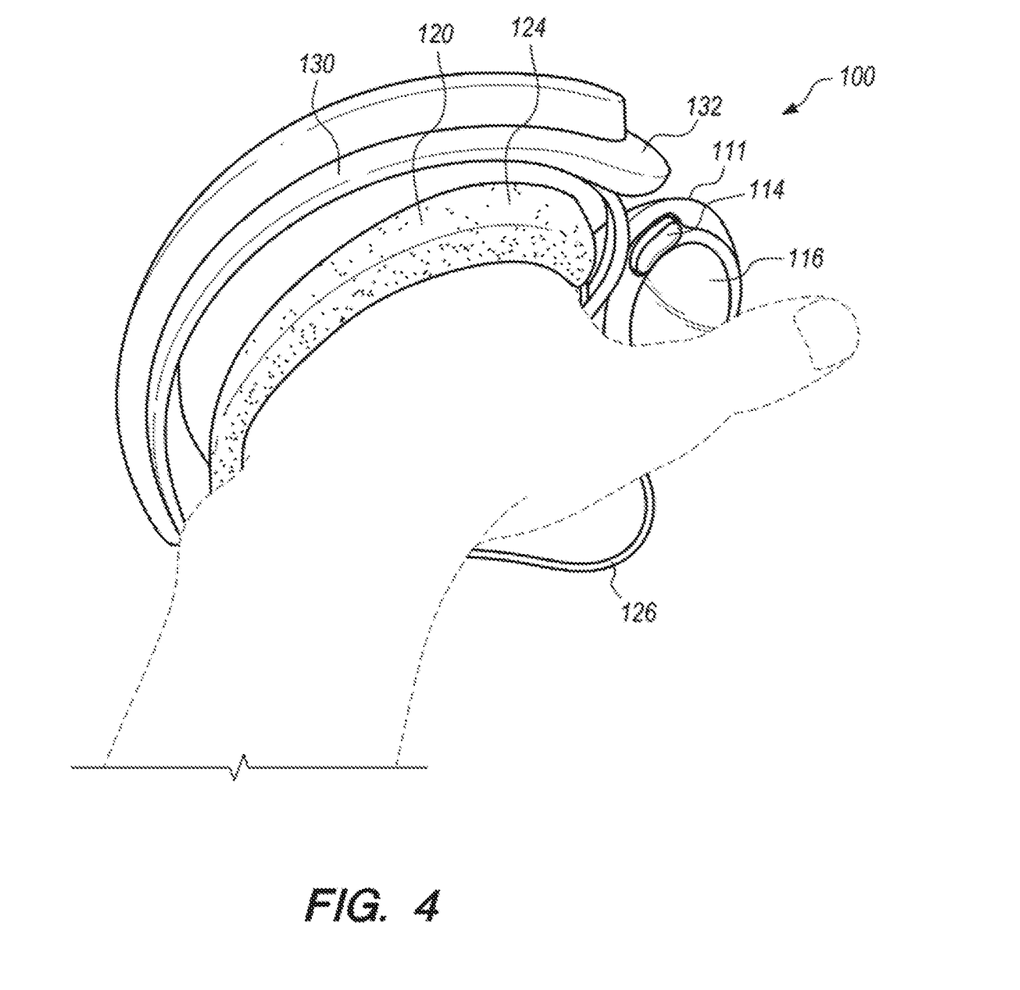
FIG. 4 depicts the controller of FIG. 1 in a user's hand, palm down.

The hand retainer 120 may be disposed between the handle portion 112 and the tracking arc 130, and be configured to contact a back of the user's hand. FIG. 2 shows the controller 100 during operation with the user's left hand inserted therein but not grasping the controller body 110. In FIG. 2, the hand retainer is closed and tightened over the hand, to physically bias the user's palm against the outside surface of the handle portion 112. In that way, the hand retainer, when closed, may retain the controller 100 to the hand even when the hand is not grasping the controller body 110. FIGS. 3 and 4 depict the controller 100 during operation when the hand retainer 120 is closed, and the hand is grasping the controller body 110 and the thumb is operating one or more of the thumb-operated controls (e.g. track pad 116).

The handle portion 112 of the controller body 110 preferably includes an array of proximity sensors that are spatially distributed partially or completely around its outer surface. The array of proximity sensors is preferably responsive to the proximity of the user's fingers to the outside surface of the handle portion 112. For example, the array of proximity sensors may be a plurality of capacitive sensors embedded under the outer surface of the handle portion 112, with that outer surface comprising an electrically insulative material. The capacitance between such an array of capacitive sensors and a portion of the user's hand is inversely related to the distance there between. The capacitance may be sensed by connecting an RC oscillator circuit to an element of the capacitance sensor array, and noting that the time constant of the circuit (and therefore the period and frequency of oscillation) will vary with the capacitance. In this way, the circuit may detect a release of a user's fingers from the outer surface of the handle portion 112.

When the hand retainer 120 (e.g. a hand-retention strap) is closed tightly, it may serve not only to prevent the controller 100 from falling out of hand, but also to keep fingers from excessively translating relative to the proximity sensor array of the handle portion 112, to more reliably sense finger motion. The electronic system may include an algorithm embodying anatomically-possible motions of fingers, to better use the sensing from the proximity sensor array to render the opening of a controlled character's hand, finger pointing, or other motions of fingers relative to controller or relative to each other. In this way, the user's movement of the controller 100 and/or fingers may help control a VR gaming system, defense system, medical system, industrial robot or machine, or another device. In VR system applications (e.g. for gaming, training, etc.), the system may render a throwing motion based on the movement of the tracking sensors, and may render the release of a thrown object based on the sensed release of the user's fingers from the outer surface of the handle portion of the controller.

Hence, the function of the hand retainer 120 (to allow the user to "let go" of the controller 100 without the controller 100 actually separating from the hand or being thrown or dropped to the floor) may enable additional functionality of the controlled electronic system. For example, if the release and restoration of the user's grasp of the handle portion 112 of the controller body 110 is sensed, then such release or grasping may be incorporated into the game to display (e.g. in VR) throwing or grasping objects. The hand retainer 120 may allow such a function to be accomplished repeatedly and safely. For example, the location of the hand retainer 120 in the embodiment of FIGS. 1-4 may help the tracking arc 130 to protect back of user's hand from impacts in real world, for example when the user moves in response to a prompt sensed in the VR environment (e.g. while practically blinded by VR goggles).

In certain embodiments, the controller 100 may include a rechargeable battery disposed within the controller body 110, and the hand retainer 120 (e.g. hand retention strap) may include an electrically-conductive charging wire that is electrically coupled to the rechargeable battery. The controller 100 preferably also includes a radio frequency (RF) transmitter for communication with the rest of the electronic system. Such RF transmitter may be powered by the rechargeable battery and may be responsive to the thumb-operated controls 114, 115, 116, the proximity sensors in the handle portion 112 of the controller body 110, and/or the tracking sensors in the tracking arc 130.

Figure 5:
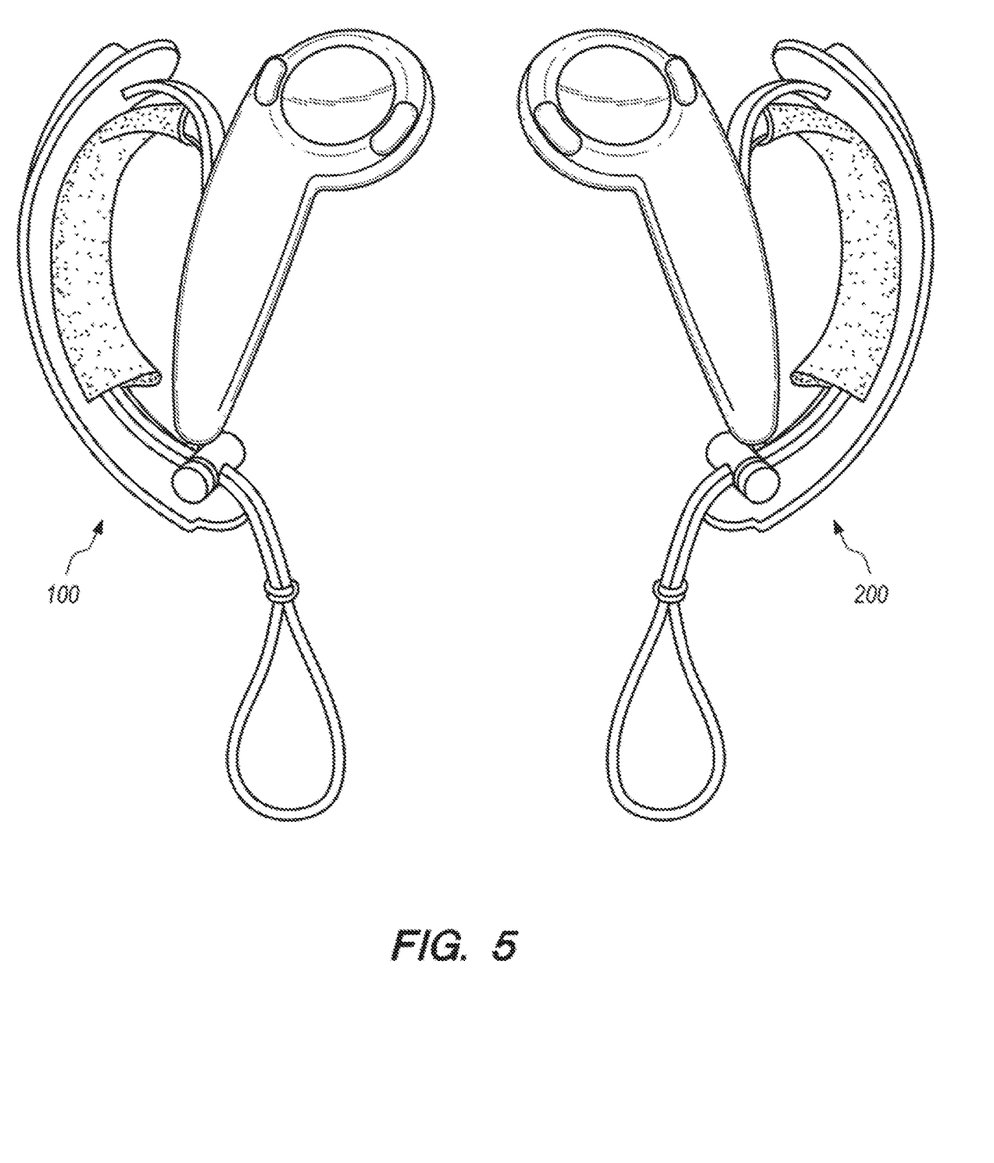
FIG. 5 depicts a pair of controllers according to an example embodiment of the present invention, with hand retainers in an open position.

As shown in FIG. 5, in certain embodiments the controller 100 may be the left controller in a pair of controllers that includes a similar right controller 200. In certain embodiments, the controllers 100 and 200 may (together) track the motion and grip of both of a user's hands, simultaneously, for example to enhance a VR experience.

The invention is described with reference to specific exemplary embodiments herein, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

We claim:

1. A controller for an electronic system, for operation by a user having a hand with fingers and a palm, the controller comprising:
    a controller body having a handle portion with an outside surface;
    a hand retainer attached to the controller body at two or more locations, the hand retainer configured to contact a back of the hand and to physically bias the palm against the outside surface of the handle portion when the hand retainer is in a closed position, wherein the hand retainer comprises:
        a curved resilient member to bias the hand retainer in an open position; and
        a cord that is connected to the curved resilient member and configured to be cinched at an end of the handle portion,
        wherein the curved resilient member is preloaded by tension of the cord when the hand retainer is in the closed position and when the cord is cinched to cause the hand retainer to automatically open when the cord is un-cinched; and
    an array of proximity sensors that are spatially distributed on the handle portion, the array of proximity sensors being responsive to a proximity of the fingers to the outside surface of the handle portion.

2. The controller of claim 1, wherein the curved resilient member includes a strip of at least one of metal or plastic.

3. The controller of claim 1, wherein the hand retainer further includes a fabric material that at least partially covers the curved resilient member.

4. The controller of claim 3, wherein the fabric material is adhered to a first side of the curved resilient member that faces the hand, and wherein a second side of the curved resilient member opposite the first side is substantially uncovered.

5. The controller of claim 1, wherein the hand retainer is adjustable in length to transition the hand retainer between the closed position and the open position.

6. The controller of claim 1, wherein the end of the handle portion is a second end of the handle portion, and wherein the controller body further comprises a distal head that extends from the handle portion at a first end of the handle portion opposite the second end of the handle portion, and wherein the cord is configured to be cinched by a spring-biased chock located at the second end of the handle portion.

7. A controller for an electronic system, for operation by a user having a hand with fingers, the controller comprising:
    a controller body having a handle portion with an outside surface;
    a hand retainer attached to the controller body, wherein the hand retainer includes:
        a curved resilient member that biases the hand retainer in an open position, and
        a cord that is connected to the curved resilient member and configured to be cinched at an end of the handle portion,
        wherein the curved resilient member is preloaded by tension of the cord when the hand retainer is in a closed position and when the cord is cinched to cause the hand retainer to automatically open when the cord is un-cinched; and
    an array of proximity sensors embedded under or on the outside surface of the handle portion, the array of proximity sensors being responsive to a proximity of the fingers to the outside surface of the handle portion.

8. The controller of claim 7, wherein the hand includes a palm, and wherein the hand retainer is configured to contact a back of the hand and to physically bias the palm against the outside surface of the handle portion when the hand retainer is in the closed position.

9. The controller of claim 7, wherein the hand retainer further includes a fabric material that at least partially covers the curved resilient member.

10. The controller of claim 7, wherein the hand retainer is adjustable in length to transition the hand retainer between the open position and the closed position.

11. The controller of claim 7, wherein the array of proximity sensors comprises a plurality of capacitive sensors.

12. The controller of claim 7, further comprising a rechargeable battery disposed within the controller body, and wherein the hand retainer includes an electrically-conductive charging wire that is electrically coupled to the rechargeable battery.

13. The controller of claim 12, further comprising a radio frequency (RF) transmitter that is powered by the rechargeable battery and is responsive to the array of proximity sensors detecting the proximity of the fingers to the outside surface of the handle portion.

14. The controller of claim 7, wherein the cord is configured to be cinched by a spring-biased chock located at the end of the handle portion.

15. A controller for an electronic system, for operation by a user having a hand with fingers, the controller comprising:
    a controller body having a handle portion with an outside surface;
    a hand retainer attached to the controller body at two or more locations, wherein the hand retainer is adjustable in length to transition the hand retainer between a closed position and an open position, and wherein the hand retainer comprises:
        a curved resilient member to bias the hand retainer in the open position; and
        a cord that is connected to the curved resilient member and configured to be cinched at an end of the handle portion,
        wherein the curved resilient member is preloaded by tension of the cord when the hand retainer is in the closed position and when the cord is cinched to cause the hand retainer to automatically open when the cord is un-cinched; and
    an array of proximity sensors that are spatially distributed on the handle portion, the array of proximity sensors being responsive to a proximity of the fingers to the outside surface of the handle portion.

16. The controller of claim 15, wherein the hand retainer further includes a fabric material that at least partially covers the curved resilient member.

17. The controller of claim 15, wherein the end of the handle portion is a second end of the handle portion, and wherein the controller body further comprises a distal head that extends from the handle portion at a first end of the handle portion opposite the second end of the handle portion, and wherein the cord is configured to be cinched by a spring-biased choc located at the second end of the handle portion.

18. The controller of claim 15, further comprising a rechargeable battery disposed within the controller body, and wherein the hand retainer includes an electrically-conductive charging wire that is electrically coupled to the rechargeable battery.

19. The controller of claim 18, further comprising a radio frequency (RF) transmitter that is powered by the rechargeable battery and is responsive to the array of proximity sensors detecting the proximity of the fingers to the outside surface of the handle portion.

20. The controller of claim 15, wherein the curved resilient member includes a strip of at least one of metal or plastic.

* * * * *